Feb. 18, 1964　　　　　A. NESIN　　　　　3,121,623
METHOD OF MAKING CRYSTALLINE ALUMINA LAPPING POWDER
Filed March 17, 1961
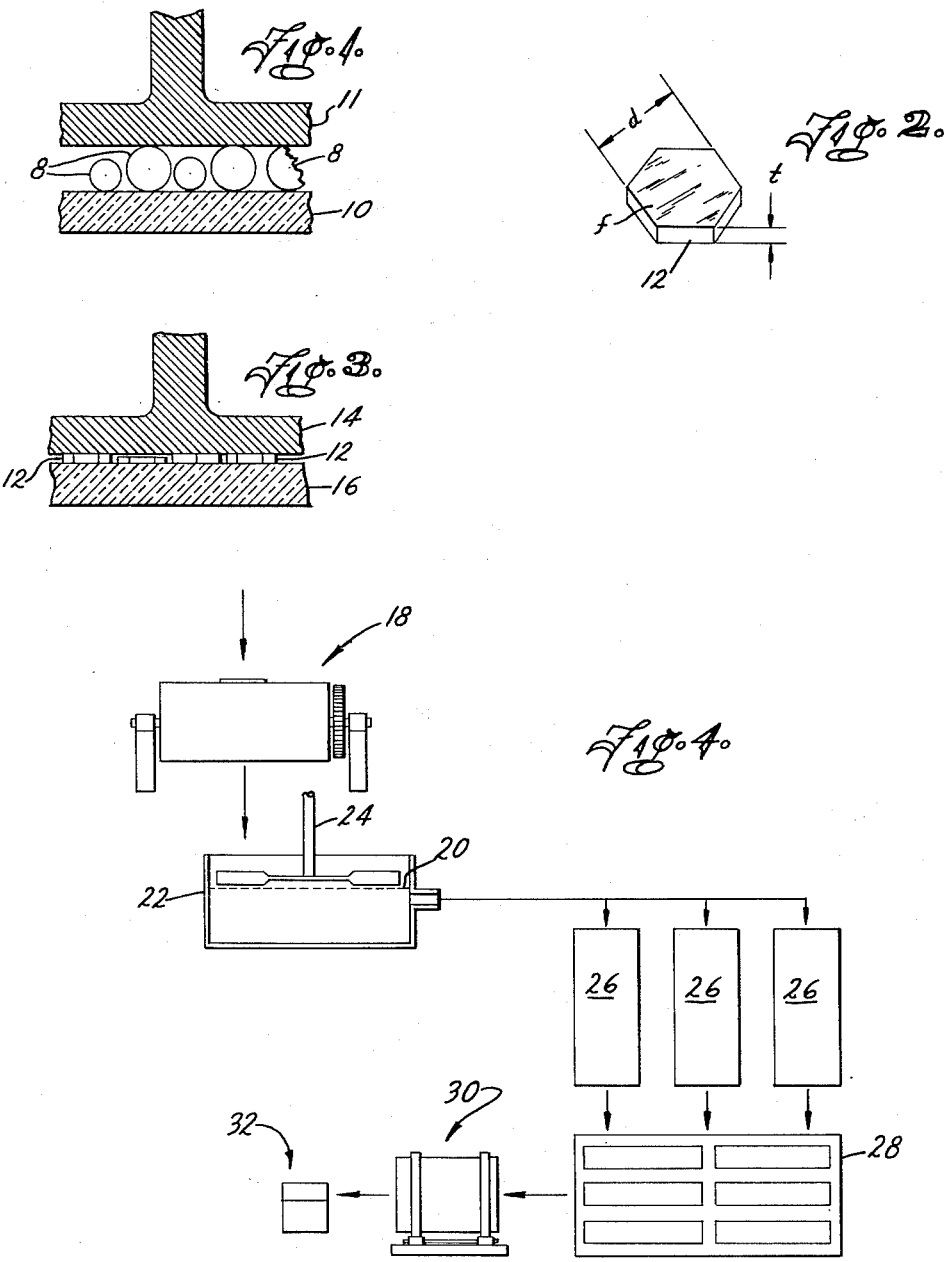
INVENTOR.
Asher Nesin
BY Chapin + Neal
Attorneys

United States Patent Office 3,121,623
Patented Feb. 18, 1964

3,121,623
METHOD OF MAKING CRYSTALLINE ALUMINA LAPPING POWDER
Asher Nesin, 10 Reed St., Westfield, Mass.
Filed Mar. 17, 1961, Ser. No. 96,591
1 Claim. (Cl. 51—293)

This invention relates to lapping abrasives and particularly to lapping powders suitable for precision lapping of materials such as glass, metals, plastics and the like, and methods for their preparation.

Aluminum oxide powders now generally used in lapping are manufactured by a process which comprises electrically fusing bauxite into the aluminum oxide mass. After hardening, the fused mass is crushed and pulverized into granular form. The sub-sieve fraction of the granular material is then sized by separating the aggregate by air or hydraulic elutriation into suitable particle size ranges for lapping powder grades. The individual grains or particles of fused aluminum oxide obtained from this process are essentially equidimensional, tending to spherical form. This results from the intense pulverizing of the fused mass. The particles are composed of fractions of fused aluminum oxide crystals bonded together by a glassy slag. The aggregate of fine particles also tends to contain a concentration of the impurities present in the fused mass. In breaking under pressure, the fused aluminum oxide particles fracture conchoidally, producing smaller particles of irregular shape and dimension having sharp edges which tend to produce deep scratches in the surface being lapped.

Since fused aluminum oxide contains a certain amount of slag and other impurities which are softer and more friable than the abrasive crystals, when the fused mass is pulverized and sized the highest concentrations of pulverized slag and impurities tend to accumulate in the finer grades of lapping powders. In generating very fine surfaces, such as in the field of precision optics, fused aluminum oxide lapping powders have a tendency to make deep scratches, requiring prolonged surface polishing to remove the scratches and to obtain the required surface finish.

The principal object of this invention is to provide improved precision lapping powders.

Another object of this invention is to provide a method of manufacturing lapping powders of the above type.

The above and other objects and advantages of this invention will be made apparent from the following description and with reference to the accompanying drawing in which:

FIG. 1 is a diagrammatic view on a greatly enlarged scale illustrating the use in lapping of fused aluminum oxide lapping powders;

FIG. 2 is a diagrammatic representation illustrative of characteristic configuration of particles comprising lapping powders embodying this invention;

FIG. 3 is a view similar to FIG. 1 showing the use of calcined alumina lapping powders embodying this invention; and FIG. 4 is a diagrammatical view illustrative of the method of making lapping powders in accordance with this invention.

As mentioned above, lapping powders made by pulverizing a mass of fused aluminum oxide are composed of granules of generally spherical configuration. The granules such as shown at 8 in FIG. 1 have only a relatively small portion of their overall surface area engageable with the surface work 10 being lapped. In addition, the granules which are composed of portions of fused aluminum oxide crystals randomly oriented, tend to fracture conchoidally forming particles having sharp or jagged edges which tend to produce deep or "wild" scratches in the part being lapped. With fused aluminum oxide, as illustrated in FIG. 1, the comparatively wide difference in the particle sizes in a given lapping powder has the effect of rendering the smaller particles relatively ineffective for stock removal. Moreover, since each of the particles has a relatively small working surface engaged with the part being lapped, stock removal is a relatively slow process and the particles are prone to fracture and break under the pressure applied by a lap such as shown at 11.

Unfused aluminum oxide, Al$_2$O$_3$, or what is known as "calcined alumina," is prepared by the calcination of an alumina hydrate. The product of this calcination is alpha alumina crystals. The process may be controlled to obtain calcined alumina crystals having a range of sizes suitable to the production of fine lapping powders. The calcined alumina obtained from this process is in agglomerate form, the agglomerates consisting of a number of the ultimate crystals of calcined alumina bonded lightly together by a surface fusion which occurs at calcination temperatures which are about 2800° F.

The method of producing calcined alumina such as described above is a step toward the manufacture of metallic aluminum, and there are commercially available a number of such calcined aluminas, one example being "calcined alumina A–5," marketed by Aluminum Company of America, for use in the manufacture of refractory materials, fused abrasives and ceramics. This material comprises alpha alumina crystals ranging in size from less than 1 micron to about 60 microns. The ultimate crystals of calcined alumina are lightly bonded together forming agglomerates which may vary in size from approximately 20 to 200 microns. There are commercially available a number of other calcined aluminas having a smaller range of particle sizes. For example, Aluminum Company of America also markets "calcined alumina A–10" having alumina crystals ranging from about 1 micron to about 30 microns. The crystals are agglomerated as in the A–5 alumina.

It has been found that the agglomerates in calcined alumina powders of the type described above can be broken down to obtain a powder which consists essentially of individual or discrete crystals of alpha alumina, the powder having an Al$_2$O$_3$ content of not less than 99%. Moreover, the calcined alumina crystals are characterized by a generally uniform disk or plate-like configuration and it has been found that the crystals are particularly suited for precision lapping operations. The crystals have very smooth faces and a Mohs' hardness of about 9. The plate-like ultimate crystalline form of calcined alumina is illustrated in FIG. 2. The crystals are generally similar in shape, having a thickness $t$ substantially less than their diameter $d$, on the order of ⅕ or less the crystal diameter. If stressed beyond the breaking point, the crystals tend to fracture so that the fractional portions retain the same characteristic plate-like shape as the unbroken crystal.

Lapping powders which consist essentially of calcined alumina crystals are superior to fused aluminum oxide powders because the plate-like alumina crystals 12 tend to orient themselves between a lap 14 (FIG. 3) and the work 16, with their larger faces $f$ (FIG. 2) parallel to the work. Thus, the characteristic shape of the crystal provides a lapping particle having a working surface which is a relatively large proportion of its overall surface area. The result is a superior surface finish to that obtainable using equivalent size and grade fused aluminum oxide particles. Tests of calcined alumina powders manufactured in accordance with this invention have shown that the incidence of deep "wild" scratches is minimized. While this result is highly desirable in any lapping operation, it is particularly advantageous and significant in the field of precision optics in which the elimination or minimization of "wild" scratches enables the generation of a superior surface and a substantial reduction in final polishing time. The relatively large surface area of the plate-like crystals also results in improved rates of stock removal and longer crystal wear and thus enables substantial savings in production time and in cost of lapping powders.

In FIG. 4 is shown a method of preparing calcined alumina lapping powders. The method comprises the steps of charging a mill 18 with agglomerates of calcined alumina obtained by calcination of alumina hydrate, as described above. The inner surface of the mill 18 is preferably a non-metallic material such as glass, ceramic, or high density alumina. The milling media comprises non-metallic balls or particles which break up the agglomerates as the mill is rotated. The balls are made of a material of sufficient density to reduce the crystal agglomerations making up the charge without materially altering the range of ultimate crystal sizes. An example of a suitable media is high density alumina balls. Alumina balls and mill lining eliminate the possibility of metallic contamination of the product, such as would result from using a steel-lined mill and/or steel milling media. Moreover, since the alumina milling media has a much lower density than steel, the agglomerates are reduced with minimum breaking of the ultimate crystals of calcined alumina.

The milling operation is carried out with a media to load ratio of approximately 5/1. The milling is done with the charge in a dry condition. Excellent results are obtained when the mill is operated at about 65% of its critical speed, at approximately 60% of its volumetric capacity. The milling is carried out for from two to five hours.

After the alumina charge has been milled as described above, it is placed in a fluid media such as water 20 contained in a decantation tank such as shown at 22. A stirring or mixing device 24 is provided to uniformly disperse the alumina particles. The water and alumina slurry should be balanced to a pH of between 7 and 8.

Sizing of the alumina crystals is accomplished by mixing, allowing the crystals to settle for a predetermined time and then drawing off the slurry. A series of decantations are carried out, each step separating out particles of a different size range. After each decantation, more water is added and, if necessary, the pH of the slurry readjusted to between 7 and 8. It has been found that the particles recovered in a given decantation tend to be more accurately sized than fused aluminum oxide particles. This is probably due to the fact that calcined alumina crystals are generally more uniform in shape, in $Al_2O_3$ content and in specific gravity than the fused aluminum oxide particles and consequently settle at a more uniform rate in the decantation process. The slurry from the decantation is placed in settling vats indicated at 26 for a sufficient length of time to permit the calcined alumina crystals to settle. Thereafter the water is drawn from the settling vats and the powder dried by any suitable means, such as drying ovens indicated at 28. If, after drying, the crystals agglomerate or stick together, they may be placed in a mill 30 or other device, and a short milling cycle used to break up the lumps and produce lapping powders comprising discrete crystals of alumina. After removal from the mill 30 the powders may be packaged as shown at 32.

Listed below are illustrative examples of lapping powders embodying this invention:

| Powder No. | Range of Particle Diameters, Microns | Average Particle Size, Microns |
| --- | --- | --- |
| 1 | Less than 1-8 | 3 |
| 2 | 2-10 | 5 |
| 3 | 4-13 | 9 |
| 4 | 7-17 | 12 |
| 5 | 11-21 | 15 |
| 6 | 13-27 | 20 |
| 7 | 18-31 | 25 |
| 8 | 23-37 | 30 |

The above powders were made using calcined alumina A-5, marketed by "Alcoa," as the starting material. The powders were found superior to those heretofore available and even when used in lapping of precision optics, the finer grades (Nos. 1-3) caused no deep scratches. This beneficial result is in sharp contrast to the results obtainable with fused aluminum oxide powders of comparable size which have proved unsatisfactory in the finest grades because of their tendency to make deep scratches in precision optics.

Included among the advantages of lapping powders embodying this invention are: (1) superior stock removal in lapping operations; (2) superior surface finish; (3) longer useful life of the lapping powder; (4) the elimination of "wild" scratches.

Having thus described my invention, what is claimed is:

Method of manufacturing precision lapping materials comprising charging a mill having a non-metallic inner surface with calcined alumina consisting of ultimate crystals of calcined alumina, each of said crystals being plate-shaped and having a thickness substantially less than the diameter thereof, and without pulverizing said crystals reducing the charge with non-metallic milling media to a material consisting of discrete calcined alumina crystals, and sizing the resulting discrete crystals by hydraulic elutriation to obtain precision lapping materials, each of said materials consisting of crystals of essentially uniform size and configuration, the variations of the size of the crystals being not greater than 15 microns.

References Cited in the file of this patent

UNITED STATES PATENTS

| | | |
| --- | --- | --- |
| 2,947,056 | Csordas et al. | Aug. 2, 1960 |
| 2,979,414 | Ryshkewitch | Apr. 11, 1961 |
| 3,011,870 | Webb et al. | Dec. 5, 1961 |
| 3,026,177 | St. Pierre et al. | Mar. 20, 1962 |